J. F. Ostrander,
Planing and Matching Machine.
N° 7,621.   Patented Sep. 3, 1850.
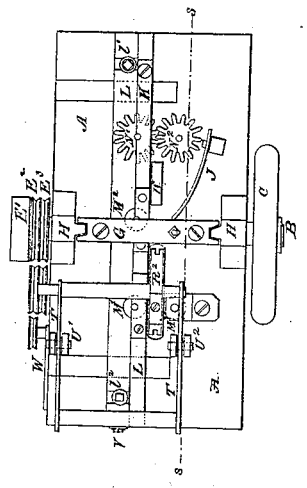
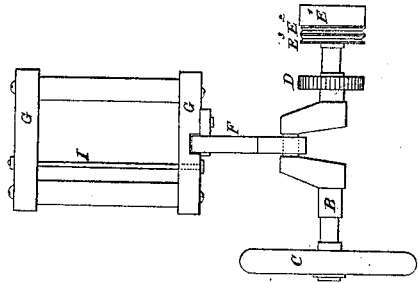
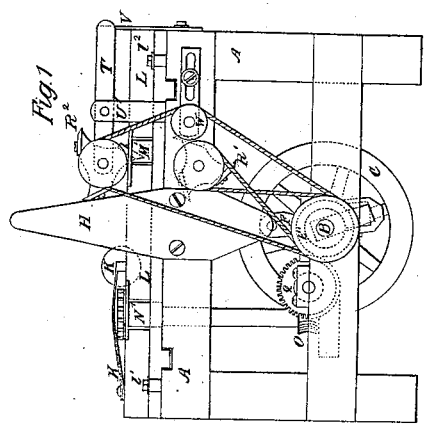
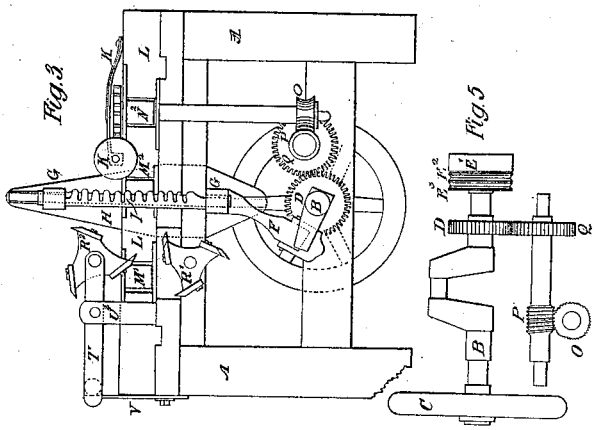
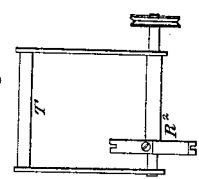
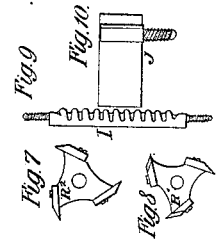

UNITED STATES PATENT OFFICE.

J. F. OSTRANDER, OF NEW YORK, N. Y.

PLANING-MACHINE.

Specification of Letters Patent No. 7,621, dated September 3, 1850.

*To all whom it may concern:*

Be it known that I, J. F. OSTRANDER, of the city, county, and State of New York, have invented a new and useful Improvement in Planing, Tongueing, and Grooving Machines; and I do hereby declare that the following is a full description of the same.

The nature of my invention consists in the peculiar construction of the cutter or planer, and its combination with a reciprocating frame, and compresser spring for holding the face of the plank or other material from splitting or lifting while under the edge of the cutter, when in motion; and the combining and adapting the same with feed rollers, tonguers and groovers and driving power for the purpose of planing, tongueing and grooving plank or other substances. But to describe my invention more particularly, I will refer to the accompanying drawings, the same letters in the several drawings, referring to the same parts wherever they occur.

Figure 1, is a vertical side view; Fig. 2, a horizontal top view; Fig. 3, a vertical cut section, though the dotted lines S, S, (Fig. 2) Fig. 4, a detached front view of the cutter, cutter frame, connecting rod, and crank shaft. Fig. 5, a detached horizontal view of the crank and feed shafts; Fig. 6, a detached horizontal view of the adjusting frame of the groover. Figs. 7, 8, 9, 10 and 11, detached views of the tonguers and groovers, and back edge, and front of the cutter, or planer, and compressing spring, and part for holding it to the table.

Letter A is the frame; B the main or crank shaft, having a fly wheel C, attached to it, and a cog wheel D, for gearing into and driving another cog wheel on the feed shaft; $E^1$, $E^2$, $E^3$, pulleys on the end of the main shaft for the power belt, and communicating motion to the tonguers and groovers; F, connecting rod, from the lower side of the reciprocating frame G, to the crank; H, H, cheek or guide pieces for the cutter frame; I, cutter or planer, made of steel of suitable size, and straight and of a peculiar cutting scalloped or wavy edge. This is done by taking a piece of shear steel, say 3 inches long about ⅜ broad, and ⅛ thick, and marking of any equal number of waves, and then on the front side, from near the back edge, file or cut toward the front edge, a beveling wavy edge, so as to make a sharp cutting wavy line of it; and then on the back or under side a corresponding wave or hollowing or scalloping out of the teeth, from the front edge, to the back, so as to produce or make a uniform wavy thickness of the undulations. By this construction of a cutter, a continuous cutting edge will be attained throughout the entire line of the wave, and in grinding or wearing away always preserve the uniformity of scallop or wave line requisite for cutting purposes. J, compresser spring, secured to the table or frame, by a port, and projecting close up to the edge of the cutter for the double purpose of holding the plank firmly against the straight edge, and that of keeping the face of the stuff to be planed from splitting or lifting under the edge of the cutter while in motion. K, groover or edge compressor spring and friction roller attached to the straight edge and pressing upon the upper edge of the plank to keep it from lifting under the action of the tonguers and groovers. L, straight edge, extending lengthwise across the table, and adjusted to any suitable thickness of stuff, by means of adjusting screws $l'$ and $l^2$, bolting through the frame or top of the table. $M'$, $M^2$, $M^3$, three friction rollers, two arranged in the face of the straight edge, and the third on the table opposite the friction roller $M'$, $N'$ and $N^2$, two feed rollers gearing together in front of the cutter for carrying the plank through the machine. These are driven by means of a cog wheel O, on the lower end of the feed roller shaft $N^2$, gearing into a screw thread P, cut on the feed roller driving shaft having a cog wheel Q, on its end and gearing into the main shaft driving cog wheel D. $R'$ and $R^2$, tonguers and groovers, one ($R'$) arranged on a fixed revolving shaft on the under side of the table and projecting through an opening in it so as to act on the lower edge of the plank, to groove it, and the other ($R^2$) suspended in an adjusting frame supported on parts secured to the frame or table. These tonguers and groovers are made somewhat of a triangular shape, and have cutters of the usual form secured to their peripheries. On the ends of their shafts are pulleys, communicating by bands with the pulleys $E^2$ and $E^3$, on the main or crank shaft, for the purpose of drawing them. T, adjusting frame, for raising or depressing the tonguer, to the required width of the stuff, to be tongued and grooved. U′ and U², parts for supporting the adjusting frame, and V, adjusting rod, attached to the back end of the frame, and by its lower end, through a slot, bolted to the frame of the machine. W, tightening pulley for the groover pulley R².

The operation of these several parts are, that when the plank to be planed is fed into the machine it is carried under the edge compresser spring K, and forward between the straight edge and face compresser spring J, till it comes in contact with the cutter, when a shaving is immediately cut from the face of it, and carried out or off, between the end of the spring, and edge of the cutter. After leaving or passing the edge of the cutter it is carried forward and between the friction rollers M′ and M³, in contact with the tonguers and groovers which on performing their duty, completes the operation, and the next plank coming in forces or pushes it from the table.

Having now described the mode of constructing, my improved planing, tongueing and grooving machine, and its operations, I will proceed to state what I claim and desire to secure by Letters Patent.

1. I claim the use and employment of the cutter I, made and fashioned in form and manner, or any analagous form and manner, whereby the peculiar cutting, beveled scalloped edge is attained, for planing or dressing plank or other material, substantially as herein set forth.

2. I also claim the use and employment of the cutter I, in combination with the compressing spring J, feed rollers and straight edge, or anyone or more of them, in form and manner and for the purposes substantially as herein set forth.

J. F. OSTRANDER.

Witnesses:
  J. A. COREY,
  CHARLES L. BARRITT.